April 21, 1970   W. M. PAGE ET AL   3,507,545
DUAL BRAKE VALVES

Filed June 10, 1968   2 Sheets-Sheet 2

INVENTORS:

WILBUR MILLS PAGE
RALPH COUPLAND

United States Patent Office 3,507,545
Patented Apr. 21, 1970

3,507,545
DUAL BRAKE VALVES
Wilbur M. Page and Ralph Coupland, Lincoln, England, assignors to Clayton Dewandre Company Limited, Lincoln, England, a British company
Filed June 10, 1968, Ser. No. 735,687
Claims priority, application Great Britain, June 19, 1967, 28,168/67
Int. Cl. B60t 15/06
U.S. Cl. 303—52
5 Claims

ABSTRACT OF THE DISCLOSURE

A dual brake valve of the concentric type comprising a primary piston and a secondary piston coaxially disposed in a common cylindrical housing for manual actuation, two sets of ports each consisting of an air supply port and an air delivery port and by which said brake valve is interconnected into two independent supply circuits, valve elements controlling air flow between the ports of each set, valve actuating means on piston structures operable when the said pistons are displaced to seal off said delivery ports from an exhaust and to connect them to said supply ports, and means providing restricted flow of pressure fluid to a baffle chamber which is operable to oppose sudden movement and to damp out oscillation of said valve elements.

---

This invention relates to dual brake valves for use in fluid pressure operated braking apparatus for motor vehicles and particularly to valves of the so-called concentric type comprising a primary piston and a secondary piston coaxially disposed in a common cylindrical housing for manual actuation, two sets of ports each consisting of an air supply port and an air delivery port and by which the brake valve is interconnected into two independent supply circuits, valve elements controlling air flow between the ports of each set and valve actuating means on the piston structures operable when the pistons are displaced to seal off the delivery ports from exhaust and to connect them to the supply ports. The object of the present invention is to provide an improved brake valve of this character in which pressure surges upon the pistons, particularly upon opening of the valve, are prevented so enabling more accurate control of the braking to be obtained.

According to the invention a brake valve of the kind mentioned comprises means providing restricted flow of pressure fluid to a baffle chamber which is operable to oppose sudden movement and to damp out oscillation of the valve elements.

A further feature of the invention comprises the construction and spring loading of the pistons such that substantially no differential arises between the two supply pressures.

Figure 1:
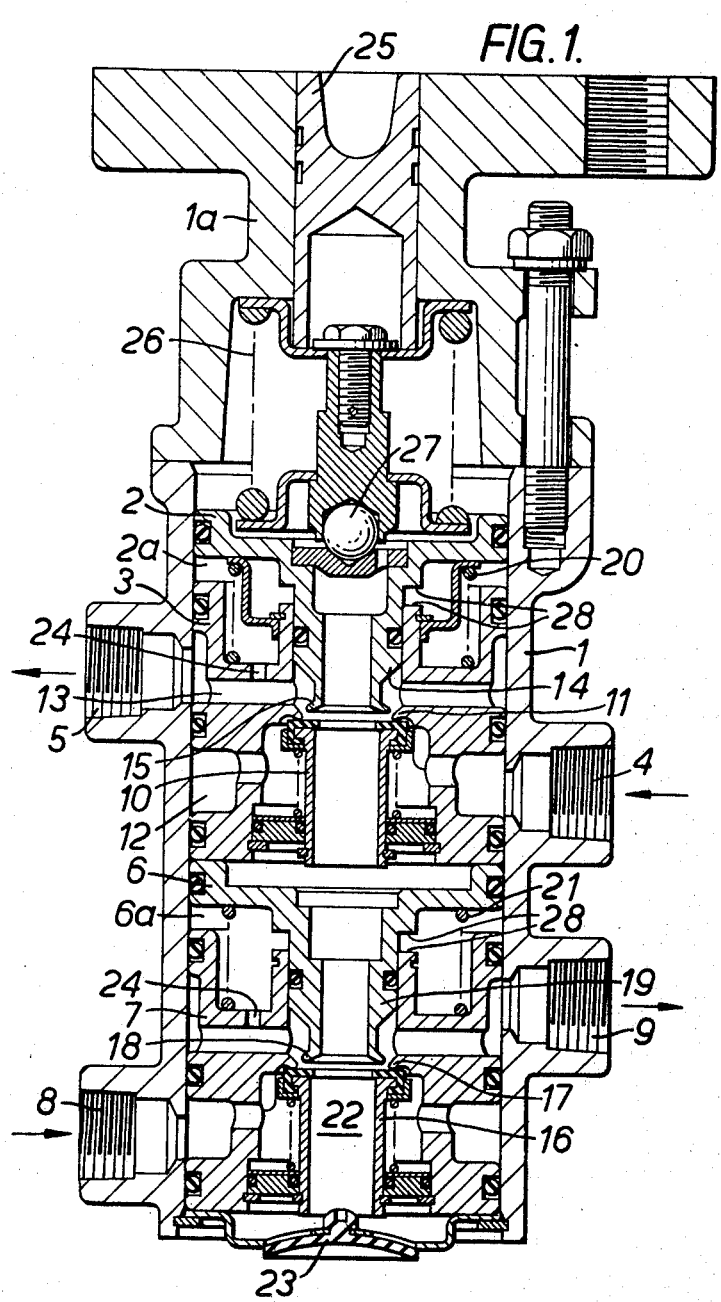
Figure 2:
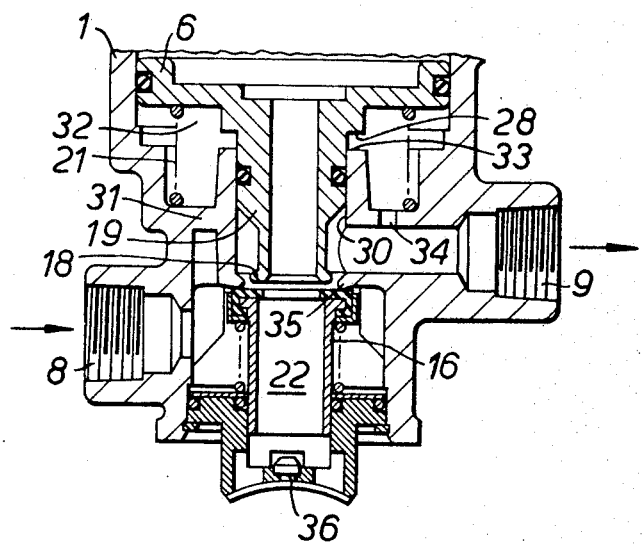

The invention will now be further described, by way of example, with reference to the accompanying drawings, in which:

FIG. 1 is an axial section through one embodiment of a valve according to the invention, and FIG. 2 shows a modification of part of the valve shown in FIG. 1.

In the drawings, like parts are denoted by like reference numerals.

Referring first to FIG. 1, the improved valve comprises a vertically-disposed cylindrical housing 1, a primary piston 2 and an associated valve guide structure 3 located in the upper part of the housing bore, and an air supply port 4 and air delivery port 5 associated with the piston and guide structure assembly 2, 3 and adapted in use to be connected into a first brake actuating circuit. The valve also includes a secondary piston 6 in the lower part of the housing bore, an associated valve guide structure 7, and further air supply and delivery ports 8, 9 respectively associated with the piston and guide structure assembly 6, 7 and adapted in use to be connected into a second brake actuating circuit. Supported within the guide structure 3 is a rubber-faced poppet-type valve element 10 which is normally spring-urged on to an annular seating 11 formed on said guide structure to close off communication between an annular chamber 12 in permanent communication with port 4 and a series of radial passages 13 in permanent communication with port 5. The piston 2 is formed with a stem 14 which is guided for axial movement within the structure 3 and which at its lower end provides a further seating 15 for co-operation with the poppet valve 10. Similarly, a second poppet valve 16 in the lower guide structure 7 co-operates with a seating 17 on that structure and with a seating 18 on a stem 19 of the piston 6 to control air flow between ports 8 and 9. The pistons 2, 6 are loaded by compression springs 20, 21 respectively whilst the piston structures and the valve elements define collectively an axial exhaust passage 22 terminating at its lower end in an exhaust port controlled by a check valve 23. The upper spring 20 has a loading of some 4 to 5 pounds more than the lower spring 21 so as to provide an adequate exhaust lift on the upper element while ensuring a minimum pressure differential between the two outputs.

For the purpose of the invention a restricted orifice 24 is provided in each of the guide structures 3, 7 such that when the poppet valves are opened to admit pressurised air to the brake circuits, the air also flows into the chambers 2a, 6a beneath the pistons 2, 6 to react on the pistons and to act as baffle or damping means for inhibiting pressure surges on the pistons and valve oscillation.

In use, an input effort applied for example by a foot pedal is transmitted to a push rod 25 in the housing cover 1a and thence through a graduated travel spring 26 and ball and socket type joint 27 to the primary piston 2. Thus piston 2 is moved downwards and, through spring 20, displaces the guide structure 3 which by abutment moves the piston 6 correspondingly against the loading of its spring 21. By these movements, the piston stems 14, 19 engage and depress their related poppet valves 10, 16, thereby closing off the exhaust connections and placing the delivery ports 5, 9 in communication with the air supply ports 4, 8 to conduct pressurised air to the brake actuators. As the upper spring 20 has a loading of only some 4 to 5 pounds more than the lower spring 21, the two pistons move substantially in unison and to the same degree so that virtually no pressure differential arises in the two brake circuits controlled by the valve. As air flows to the delivery ports, part of it is bled off through the orifices 24 to the chambers 2a, 6a and builds up pressure therein until it reacts on the pistons to a degree sufficient to counterbalance the applied effort and to raise the pistons to a lapped position where further admission of air to the brake actuators cease whilst retaining the air in the actuators to hold the brakes on. As previously explained, the air under pressure in the chambers 2a, 6a also acts as baffle or damping means to oppose pressure surges on the pistons and prevent motoring or oscillation of the valves.

It will be understood that further effort on the brake pedal will re-open the valves to increase the degree of braking whilst removal of the applied effort will permit the valve elements and the pistons to return to their initial positions under their spring loading.

The pistons are fitted with appropriate O-rings to seal the relatively sliding surfaces and the pistons and guide structures are formed with opposed shoulders 28 or the equivalent which by abutment permit direct manual actuation of the secondary piston through the primary piston in the event of loss of pressure in the first circuit.

Turning now to FIG. 2, it will be seen that this embodiment is the same as the embodiment shown in FIG. 1 except that the valve guide structure 7 of FIG. 1 is replaced by a structure formed integrally with the housing 1. This structure includes a bore 30 for the valve stem 19 connected by a web 31 to the housing 1 and co-operating with piston 6 to form a chamber 32 similar to chamber 6a. The web 31 is provided with a shoulder 33 for abutment with the shoulder 28 on piston 6. A restricted orifice 34 is provided in the web 31 and is the equivalent of orifice 24 in the valve guide structure 7 of the FIG. 1 embodiment. A valve seat 35 is also formed on the housing 1 for engagement with the poppet valve 16. An exhaust valve 36 similar to exhaust valve 23 in FIG. 1 is also provided. The dual brake valve illustrated in FIG. 2 operates in exactly the same manner as the valve illustrated in FIG. 1. The advantage with the valve shown in FIG. 2 is that the lower valve guide structure can be eliminated thus resulting in a considerable saving in the production cost of the valve according to the invention.

We claim:

1. A dual brake valve of the concentric type comprising a cylindrical housing, a primary piston and a secondary piston coaxially disposed for manual displacement in said housing, brake actuator means connected to said primary piston, structural means operatively connecting said primary and secondary piston during normal operation of said valve to positively, substantially simultaneously displace said secondary piston along with said primary piston upon displacement of said primary piston in a brake applying direction by said brake actuator means, two sets of ports, each comprising an air supply port and an air delivery port, said sets of ports connecting said brake valve into two independent brake control circuits, valve means controlling air flow between the ports of each set, air exhaust means, valve actuating means on said pistons operable when said pistons are displaced in a brake applying direction to disconnect said delivery ports from said exhaust means and connect said delivery ports to said supply ports, and means providing restricted flow of pressure fluid to a baffle chamber associated with each piston operable to oppose sudden movement of said pistons and to dampen the oscillation of said valve means, said structural means including a guide structure slidable in said housing and operatively connected to said primary piston, said guide structure accommodating the valve means associated with said primary piston and being normally axially spaced from said primary piston to define a baffle chamber therefor, and said guide structure having an axial bore to slidably receive said valve actuating means in operative alignment with said associated valve means.

2. A dual brake valve as claimed in claim 1, wherein said pistons, said valve means, and said valve actuating means are axially bored to provide a continuous axial exhaust passage to which said delivery ports are connected when said pistons are in a non-braking position.

3. A dual brake valve as claimed in claim 1, wherein said guide structure includes passage means through which air flow controlled by said associated valve means is delivered to the associated delivery port, said baffle chamber for said primary piston being connected to said passage means by a restricted opening.

4. A daul brake valve as claimed in claim 1, wherein said guide structure is in abutment with said secondary piston and said primary and secondary pistons are loaded by springs of substantially equal strength to provide unified movement of said pistons and avoid a pressure differential in the two independent brake control circuits.

5. A dual brake valve as claimed in claim 1, including cooperating abutment means on said primary piston and said guide structure operable to permit direct manual actuation of said secondary piston through said primary piston in the abnormal occurence of loss of pressure in the primary piston controlled circuit.

References Cited

UNITED STATES PATENTS

| 2,410,966 | 11/1946 | Eaton | 303—54 |
| 2,515,946 | 7/1950 | Cadman | 303—53 X |
| 3,366,424 | 1/1968 | Edwards | 303—52 |

FOREIGN PATENTS

| 768,583 | 2/1957 | Great Britain. |
| 1,052,837 | 3/1959 | Germany. |

MILTON BUCHLER, Primary Examiner

J. J. McLAUGHLIN, JR., Assistant Examiner

U.S. Cl. X.R.

137—116, 592.2, 627.5; 303—54, 40